Figure 11:
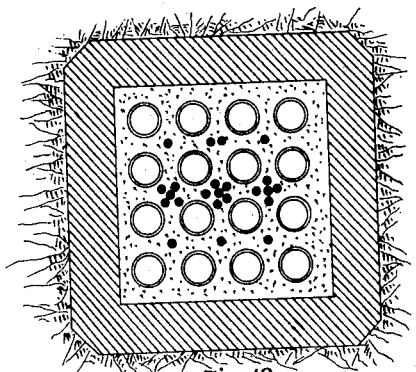

(No Model.) 2 Sheets—Sheet 1.
C. DETRICK.
CONTINUOUS UNDERGROUND PIPE AND METHOD OF MAKING THE SAME.
No. 245,285. Patented Aug. 9, 1881.
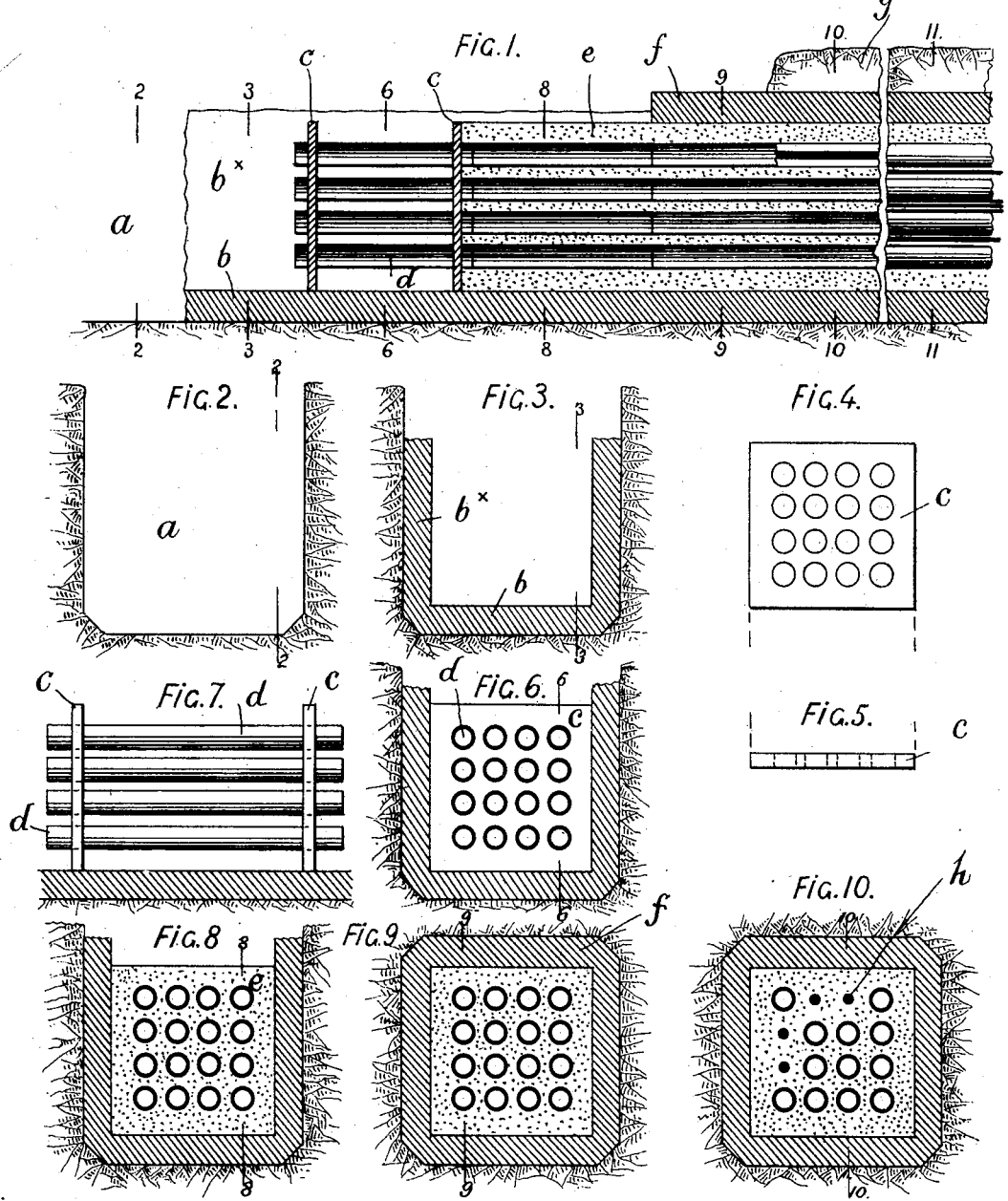

(No Model.) 2 Sheets—Sheet 2.

C. DETRICK.
CONTINUOUS UNDERGROUND PIPE AND METHOD OF MAKING THE SAME.

No. 245,285. Patented Aug. 9, 1881.

WITNESSES:
Alex. Barkoff
John Tolleson

INVENTOR
Calvin Detrick
By his Attorneys,
W. C. Strawbridge,
Bonsall Taylor.

N. PETERS, Photo-Lithographer, Washington, D. C.

UNITED STATES PATENT OFFICE.

CALVIN DETRICK, OF PHILADELPHIA, PENNSYLVANIA.

CONTINUOUS UNDERGROUND PIPE AND METHOD OF MAKING THE SAME.

SPECIFICATION forming part of Letters Patent No. 245,285, dated August 9, 1881.

Application filed June 23, 1881. (No model.)

*To all whom it may concern:*

Be it known that I, CALVIN DETRICK, of Philadelphia, Pennsylvania, have invented an Improvement in Continuous Underground Pipes and in Methods for Forming and Laying the Same, of which the following is a specification.

My invention relates, in general, to such tubing, pipes, or underground conduits or passages as are employed for the purposes of drainage, sewerage, water supply, gas supply, inclosure of electric, telegraphic, or telephonic wires, or are employed for pneumatic, hydraulic, or other kindred uses.
My invention relates, specifically, to a certain invention of similar character made by me, application for patent for which was filed April 20, 1881, and in which the subject-matter claimed upon consisted, essentially, in first, excavating to the required depth, shape, and extent, and in the required direction, a trench or channel in the ground in which it is desired that a pipe should be laid; second, in progressively laying within the said trench a layer, stratum, bed, or continuous mass of plastic material adapted to subsequently solidify; third, in superimposing upon or embedding in said layer of soft plastic material, one or more formers or cores of exterior shape corresponding with the desired interior shape of the bore or bores of the pipes; fourth, in superimposing upon said former or formers superimposed upon or embedded in said layer or mass of soft plastic material, or upon said soft plastic material, a covering, layer, or continuous mass of plastic material adapted to subsequently solidify; fifth, in removing the former or formers, and replacing the excavated substance of the trench; and my invention further specifically relates to another invention made by me, application for patent for which was filed in the United States Patent Office, May 23, 1881, which latter invention is an improvement upon that first mentioned, and embraces a method of making a pipe more or less cognate thereto, and which results in the production of a continuous seamless pipe formed of a walled layer or trough of artificial stone or kindred material containing within its walls a layer, stratum, bed, or continuous mass of hardened plastic fluid, semi-fluid, or kindred material formed with ducts or passage-ways, and covered by a slab or other covering of artificial stone or kindred material.

The object of my present invention is the manufacture, continuously, of a pipe embodying the best features of construction of my two former inventions, and being, further, an improvement thereupon in so far as there results from it a pipe the bores of which are provided with a smooth and a practically continuous inside lining, which lining is itself utilized to aid in the making of the improved pipe.

My invention differs from my first invention in that, instead of employing formers which are progressively advanced as the pipe is being constructed, and do not remain in the bores which they assist in forming, I employ hollow formers of paper, sheet metal, or other suitable pliable substance, which I leave in the bores, and which themselves constitute the permanent interior lining of the bores, and, further, differs in other particulars, which a further discussion will disclose. It differs from my second invention referred to in that, while the resultant pipe is similarly enveloped or surrounded by an outer envelope of artificial stone or kindred hardened material, yet the bores formed in the plastic non-conducting substance embraced by said artificial stone and constituting the pipe proper are formed, not as in my second invention, by impression by means of dies, but by the employment of hollow formers remaining permanently embedded after the application of the plastic material.

My invention further provides for the employment of insulating-wires in connection with the ducts or passage-ways embedded in the substance of the pipe.

The object of my invention is the construction of a wholly continuous composite pipe embodying one or a series of continuous seamless hermetically-tight and suitably-lined ducts or passage-ways, which pipe is adapted, by virtue of the method of its construction, to be formed of any desired length, and to be constituted of suitable plastic or readily-molded, fluid, or semi-fluid, material, adapted to solidify into a rigid and impervious mass of a predetermined configuration and arrangement; and its farther object is to provide, in connection with a pipe of the above construction, one or a series of incased, inclosed, or embodied insulated wires, which can either be used or not used, at will.

To the above ends my invention consists in the pipe and in the method of continuously laying and forming the same, hereinafter set forth and claimed.

Figure 15:
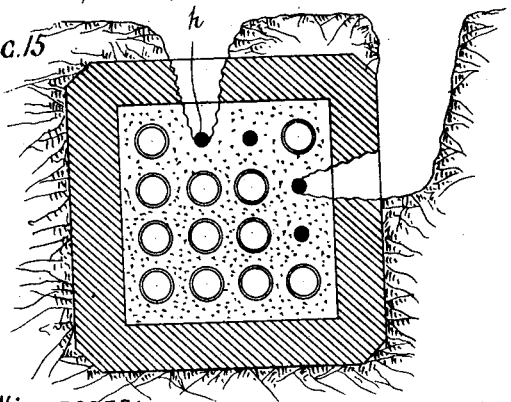
Figure 16:
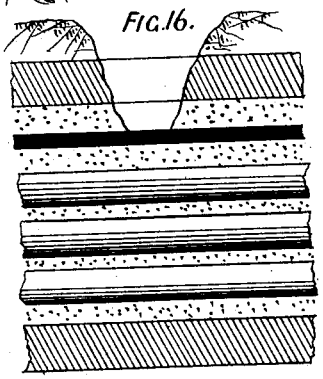

In the accompanying drawings, Figure 1 represents, in longitudinal sectional elevation, a trench in which, in its successive stages, is being conducted my improved method of laying pipe. Figs. 2, 3, 6, and 8 represent, in transverse sectional elevation, views across the trench of Fig. 1, taken respectively on dotted lines of Fig. 1, marked with numerals corresponding to those of the several sectional views referred to, the said views representing, as fully as is possible by means of pictorial illustrations, the method by which my pipe is formed and laid. Fig. 4 is the side elevation, and Fig. 5 a top view, of a convenient support for the formers. Fig. 7 represents, in side elevation, former-supports of the above description as applied to the support of the formers prior to the casting or introduction of the plastic material thereabout. Figs. 9, 10, 11, 12, 13, and 14 represent, in end elevation, various convenient constructions of pipe embodying my invention and formed by the method herein set forth. Fig. 15 represents, in transverse sectional elevation, a method whereby attachment of side and separate wires can be made to a main wire or conductor embedded in the pipe. Fig. 16 represents, in longitudinal sectional elevation, the same operation.

Similar letters of reference indicate corresponding parts.

My pipe is laid and made in the following manner:

A trench, $a$, Figs. 1 and 2, is first dug in the ground to the required depth, and in the required direction from the point of departure of the intended pipe to the point at which such pipe is to terminate. The bottom of this trench is preferably leveled, as shown in Fig. 2 and on line 2 2 of Fig. 1. This leveling is effected by any convenient means. After the trench has been formed and leveled, as above, it is, if desired, suitably hardened—as, for instance, by pressure, percussion, or impact—unless the consistency of the ground renders such hardening unnecessary. The trench is then supplied with a walled layer or "trough," $b$, as I find it convenient to term the formation of artificial stone, which is indicated in Fig. 3, and at line 3 3 of Fig. 1. This trough may be formed in any desired manner—that is to say, it may either be constructed by the laying upon the floor of the trench of blocks of artificial stone or kindred material adapted to subsequently solidify into a strong envelope, outer casing, or jacket, so to speak, to the inclosed pipe, or else by the flowing of plastic material of a nature kindred to that of artificial stone upon said floor, and its subsequent molding thereon into the form represented in Fig. 3 of the drawings, which is that of a longitudinally-extending base provided with side walls, $b^x$; or, again, this trough may be previously formed in sections and subsequently laid in place in the trench.

I here remark that it is not vital that this walled trough, which subsequently constitutes the outer integument or envelope of the inclosed bore-provided mass, should consist in every instance of artificial stone, or even of a plastic substance adapted to subsequently solidify, as it well may be that some other suitable substance or material may be employed with however less beneficial effect than artificial stone; but it is of the essence of my invention, so far as the same relates to this walled trough and its peculiar construction and office, that there should be first constructed or laid within the trench a trough, gutter, or channel of some description and of a hard substance, which trough should be employed to receive and contain the plastic insulating material, which is subsequently flowed or cast about the formers, which should support the same until hardened, and which should be subsequently efficacious as a protecting device to guard and protect the bore-provided mass after the pipe is completed.

Thus far I have described substantially a portion of the operation resorted to by me in the carrying out of my second invention referred to.

When the trough has been laid or formed as above and is hard, I next erect, preferably in a transverse vertical position within the same, two "former-supports," C, as I term them, which are provided with as many holes of such diameter and in such arrangement and relation therein as it is desired that the bores of the pipe should subsequently occupy with respect to a transverse section through the pipe.

For greater clearness of illustration I have represented in certain of the figures of the drawings, 4 and 5, former-supports provided with sixteen holes and designed to support sixteen formers, and thereby enable the production of a pipe with sixteen bores. In said Figs. 4 and 5 a suitable former-support is shown, which is for convenience to be of such dimensions as will fill transversely across both, in breadth and height, the walled trough. In Fig. 7, in side elevation, are represented two former-supports with the formers in place.

It is here proper to state that the former-supports themselves are a mere expedient to enable me support in proper relative arrangement a given number of hollow formers, $d$, designed to form the subsequent bores of the pipe, and that many other devices in the nature of supports may be employed in lieu of the specific supports represented, which will equally well effectuate this portion of my invention. Under the supposition, however, that the former-supports represented have been erected in one end of the trough within the trench, the next step of my invention is then to introduce and rest in said former-supports a sufficient or desired number of hollow formers, Figs. 6, 7, and 1, lines 6 6, whereof hereinafter, and while they are supported in such manner, or in any other convenient manner which causes them to take the proper position to surround, cast over, flow, or otherwise cause to assume position around, between, and among the formers, a proper quantity of such soft or plastic fluid or semi-fluid insulating material, e, as it is desired to form the substance of the pipe of, as represented at lines 8 8 of Fig. 1 and at Fig. 8. Such material is preferably asphalt-concrete, real Trinidad or Cuban, or artificial asphalt, although many other substances adapted to subsequently solidify and best possessing insulating properties will answer the purpose.

The hollow formers, which I prefer to employ, are sections of a given length—say ten feet—of cylinders of light sheet metal—such as brass, zinc, or tinned iron—of wood, wood pulp, paper-pulp, prepared paper rendered, if desired, hard, stiff textile fabric, or other like substance, and at the same time smooth on the surface. These formers are to be previously prepared in any preferred manner.

After the plastic material cast between the former-supports at the end of the trench, in which the operation of laying is commenced, has been allowed to harden, it will be found that it has rigidly set and enveloped the formers, so as to have caused them to assume and retain given fixed positions relatively to each other. When, as before stated, the section of plastic material containing the formers and located between the former-supports has hardened the former-supports are to be withdrawn in an endwise direction, or otherwise removed, and a second series of hollow formers applied over or against the projecting extremities of the first series and suitably supported, and the operation repeated as to the new series—that is to say, a further mass of plastic material is to be applied in such a manner as to surround the new series of formers between the end of the mass first applied and hardened and the former-support employed with the new series; and after such section has been allowed to harden the operation is to be repeated continuously throughout the walled trough until the entire pipe is laid. After the embodying mass of plastic material has hardened to the required extent, a slab layer or covering of artificial stone, f, Fig. 9, and line 9 9, Fig. 1, hardened asphalt-concrete, glass, or other vitreous material covered, if desired, with asphalt, iron, or wood, likewise coated or felted with asphalt, or, preferably, whatever material has been employed in the formation of the substance of the trough, is to be superimposed upon the top of the mass of plastic material to the entire width of the trench, so as to rest upon the walls of the trough and form a covering or complete the envelope or casing which the trough constitutes. In laying this covering it is preferable that the surfaces intended to be brought into contact should be in a soft or glutinous condition, so as to insure the hermetical inclosing of the plastic layer or mass by the slab or covering. After the slab or covering has been thus laid the earth g in the trench, Fig. 1, lines 10 10, when the slab is not level with the surface, is to be replaced upon it; or, if the trench is a deep one, and it is so desired, a second trough can be formed and laid, as described, upon the slab, and the entire operation be repeated in said upper or superimposed trough.

The composition of which the layer or plastic mass e within the trough may be composed is, broadly speaking, any substance capable of being molded, impressed, flowed, or otherwise caused to spread while in a soft plastic or fluid condition, and which is adapted subsequently to solidify in the position and relation which it has assumed while soft and prior to hardening.

It will be obvious from the foregoing description that my method enables the continuous formation of a continuous seamless pipe provided either with one or a series of independent lined bores. It will also be obvious that my pipe is adapted to be formed and laid below the ground in such position in relation thereto as it is designed that the pipe should permanently occupy, and likewise that all joints or couplings will be dispensed with, as, indeed, are all handling and transportation of sections of pipe, my invention providing a means whereby seamless pipe having one or more bores or ducts of any desired configuration and extension can be simultaneously manufactured and laid in position for subsequent permanent use. It will be also understood that the formers, instead of being circular in section, may be square, triangular, or polygonal, or of such other sectional contour as is desired, the plastic mass flowing with equal ease about the formers, be their exterior shape regular or irregular. In practice a cylindrical tube is the best form, as it enables the introduction of wires with the greatest ease, is adapted to contain as many wires for its area as any other form, and is readily butted or overlapped at the points where coupling or jointing to the adjoining section is necessary.

Figure 12:
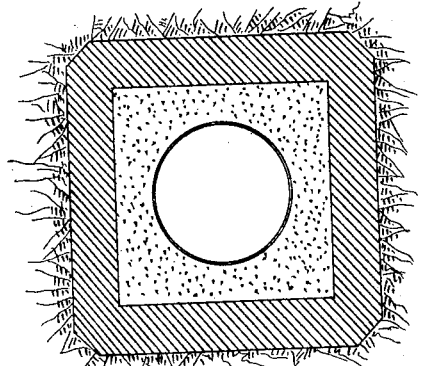
Figure 13:
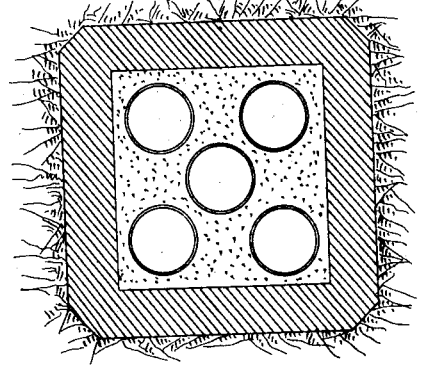
Figure 14:
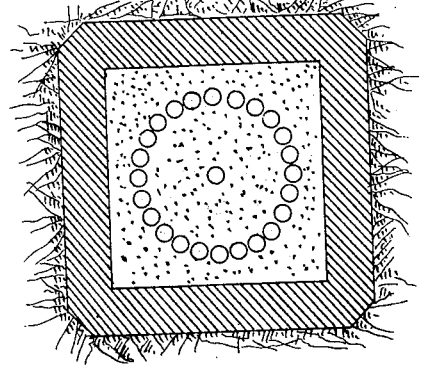

In Fig. 13 is represented a pipe provided with but five bores, while in Fig. 14 is represented a pipe provided with twenty-five bores, and in Fig. 12 a pipe with but a single central bore.

I have discovered that in connection with the construction of my pipe as above set forth I can most advantageously, and by the very means employed to form the lined bore of the pipe itself, embed one or a series of conducting-wires. In the drawings I have represented in certain of the views—namely, Figs. 1, 10, 11, 15, and 16—certain arrangements of wires, and have designated these wires by the letter "h." I introduce the wires in the same manner that I introduce the formers in the construction of the pipe—namely, by stretching singly or in series, and in such position and relation to the formers as it is desired that they should permanently occupy, a given number of wires by means of the same supports which retained the formers, and which are in such employment provided with the proper orifices or holes for the reception of the ends or end of the wires. The wires of course do not require to be jointed, as the hollow formers do, but are applied by unwinding from reels which are carried by hand or other suitable means along the trench as the pipe is progressively constructed.

I thus produce a pipe which contains, if desired, a sufficient number of ducts or passageways as will fit it for pneumatic uses, and for the containing within any of said bores of a series of wires, themselves properly insulated and placed to the required number in such bore, and which, in addition, contains if desired a series of permanent conductors which can be used or not at will, and which can at small cost be applied and embodied within the pipe at the time the latter is being made, and which may at any time be connected with at different points without removing the pipes from the ground by excavating to the outer envelope of the pipe and cutting through said envelope and down through the substance of the plastic mass to a give-wire desired to be connected with, as indicated in Figs. 15 and 16. Connection with a side wire to a house can thus be made without the necessity of the separate laying of wires and without the necessity of the raising up of the pipe, it being, of course, understood that after connection is made with wire the connecting-wire is made hermetically tight by the use of plastic material and artificial stone to replace the latter substances as cut into in the making of the connection.

In constructing the walled trough within the trench it may be found convenient, after the floor of said trough has been formed and laid, to erect temporarily boards or the like, to constitute the side walls and to contain the plastic mass as the same is flowed about the formers, and subsequently to remove these boards after the plastic mass has hardened upon its contained formers, and then construct the side walls of the permanent material, (artificial stone,) of which it is designed that the entire envelope of the plastic mass should consist. In such points of construction as this, as well as in that referred to of the former-supports, I address myself to the intelligence of the mechanics employed to construct the pipe, as it is obvious that while the principle of a series of ducts or passage-ways lined with sheet metal or paper, or such material enveloped and insulated by a hardened plastic mass, which mass, as a whole, is surrounded by a protecting integument, envelope, or casing, is the vital principle of the invention, yet that many methods of construction will enable the carrying out of such principle, and effectuate perhaps equally well the practice of the invention itself.

Having thus described my invention, I claim—

1. The method of forming continuous seamless pipe hereinbefore described, which consists, first, in excavating to the required depth, shape, and extent, and in the required direction, a trench or channel in the ground in which it is desired that a pipe should be laid; second, in progressively laying, constructing, or otherwise forming within said trench a walled layer or trough of artificial stone or kindred hard material; third, in progressively placing in proper position and relation in said trough one or a series of hollow formers of paper, sheet metal, or other suitable fabric; fourth, in surrounding said hollow former or formers placed within the trough with a continuous mass of plastic, fluid, semi-fluid, or kindred material adapted to solidify about the formers, and to retain them rigidly and in an insulated condition in position; fifth, in superimposing upon said mass of plastic material enveloping the formers a covering of artificial stone or any hard material adapted to complete the inclosure and afford protection to the hardened plastic mass enveloping the formers, all substantially as described.

2. A continuous seamless pipe formed of a walled layer or trough of artificial stone or kindred material, in which trough is contained a continuous mass, layer, stratum, or bed of hardened plastic fluid, semi-fluid, or kindred material, in which mass is inclosed one or a series of hollow suitably-shaped tubes of sheet metal, paper, or the like, and which is covered by a layer or other covering of artificial stone or kindred material, which completes the inclosure of the mass.

3. A continuous seamless pipe formed of a walled layer or trough of artificial stone or kindred material, which contains a continuous mass, layer, stratum, or bed of hardened plastic fluid, semi-fluid, or kindred material, which mass incloses one or a series of hollow suitably-shaped tubes of sheet metal, paper, or the like, and also incloses one or a series of connecting-wires embedded in such position and relation therein as it is desired that said wire should assume, and which is covered by a layer or other covering of artificial stone or kindred material, which completes the inclosure of the mass.

In testimony whereof I have hereunto signed my name this 20th day of June, A. D. 1881.

CALVIN DETRICK.

In presence of—
J. BONSALL TAYLOR,
W. C. STRAWBRIDGE.